United States Patent [19]
Fukuda

[11] 3,964,849
[45] June 22, 1976

[54] MOLD APPARATUS FOR CONTINUOUSLY PRODUCING LAMINATED RESINOID MATERIAL

[76] Inventor: Heijiro Fukuda, No. 123, 3-chome, Umegaoka, Nagaokakyo Kyoto, Japan, 617

[22] Filed: Apr. 23, 1975

[21] Appl. No.: 570,982

Related U.S. Application Data

[62] Division of Ser. No. 494,015, Aug. 1, 1974.

[30] Foreign Application Priority Data

| | | |
|---|---|---|
| Oct. 9, 1973 | Japan | 48-113718 |
| Oct. 9, 1973 | Japan | 48-113720 |
| Oct. 9, 1973 | Japan | 48-117761[U] |
| Mar. 18, 1974 | Japan | 49-31284 |

[52] U.S. Cl. .............................. 425/224; 425/447; 425/DIG. 201
[51] Int. Cl.² .............................. B29D 7/02
[58] Field of Search .......... 425/130, 256, 447, 200, 425/209, 224, 371; 198/73

[56] References Cited

UNITED STATES PATENTS

| | | | |
|---|---|---|---|
| 812,147 | 2/1906 | McConnell | 425/447 X |
| 824,202 | 6/1906 | Peters | 425/224 X |
| 1,891,790 | 12/1932 | Wilderman | 425/209 X |
| 3,123,889 | 3/1964 | Watts et al. | 198/73 X |

*Primary Examiner*—Robert L. Spicer, Jr.
*Attorney, Agent, or Firm*—Allison C. Collard

[57] ABSTRACT

Resinoid wheels are continuously produced by preparing resinoid abrasive compositions each different in the size of abrasive grains contained therein, placing the abrasive compositions into a die in the form of superposed layers, molding the superposed layers into a block, heating the block by a high frequency heater, passing the heated block through multiple pairs of rolls to roll the block into a sheet, blanking out circular pieces from the rolled sheet and baking the circular pieces.

2 Claims, 6 Drawing Figures

MOLD APPARATUS FOR CONTINUOUSLY PRODUCING LAMINATED RESINOID MATERIAL

This is a division of application Ser. No. 494,015 filed Aug. 1, 1974.

BACKGROUND OF THE INVENTION

The present invention relates to laminated resinoid wheels for cutting hard metal materials, a method for continuously producing the resinoid wheels and an apparatus to be used for the method.

Generally, the cutting ability of resinoid wheel varies with the kinnd of abrasive grains, grain size, kind of binder and porosity. Grinding wheels of various hardnesses have heretofore been produced from a single composition, and a wheel of particular hardness is selected for use in accordance with the material and construction of the article to be cut. Thus a hard grinding wheel is used for cutting hard metal materials. However, the harder the grinding wheel, the greater will be the cutting resistance encountered, with the result that cutting operation produces a large amount of heat which scorches the cut surface of the material, causing distortion, changes in the hardness of the cut portion and discoloration in the cut surface. Moreover, the irregularities left over along the periphery of cut portion need further finishing procedure. In addition, it is difficult to provide a planar cut surface with a sharp cut edge, whilst the rough abrasive surface is liable to be clogged up to render the wheel no longer operative.

Conventional resinoid wheels have been produced by placing a kneaded resinoid abrasive composition into a die of a given shape, smoothing the surface of the composition with raking means to give a uniform thickness to the mass of the composition, molding the composition at an elevated pressure and baking the molded product. However, this method has the drawback that relatively coarse abrasive grains are caught by the raking means and brought to the surface, rendering the resulting product uneven in grain size distribution. Further according to the conventional method, the raked mass of the starting abrasive composition is pressed on one side for molding. Consequently, the grinding wheel obtained becomes uneven in hardness, inasmuch as the product has high hardness where many coarse abrasive grains are present but low hardness where smaller grains are predominant. When put to use, the grinding wheel wears away more markedly where it contains many fine abrasive grains than where coarse grains predominate, so that an uneven wear takes place. As a result, the grinding wheel not only fails to cut a work straight but is also subjected to an objectionable force and possibly broken in an extreme case. Moreover, if the abrasive composition is not fully raked, the resulting product will have a nonuniform thickness, consequently producing errors when cutting a hard metal material, and a markedly irregular portion of the grinding wheel, if any, will cause an objectionable force to act on and break the grinding wheel during use.

SUMMARY OF THE INVENTION

The present invention has overcome the foregoing problems and provides laminated resinoid wheels, a method for continuously producing the same and an apparatus for practicing the method.

This invention is characterized by a method for producing a laminated resinoid wheel comprising the steps of preparing at least two kinds of abrasive compositions each containing abrasive grains different in size from those of the other composition, placing specified amounts of the abrasive compositions into a die in the form of a desired number of superposed layers respectively, molding the superposed layers into a block, heating the block, rolling the heated block into a sheet, blanking out a circular piece from the sheet and baking the circular piece.

The invention is further characterized by a laminated resinoid wheel produced by the method described above and comprising a core layer made of an abrasive composition containing abrasive grains and at least one pair of layers arranged on the opposite sides of the core layer symmetrically thereof and made of an abrasive composition containing abrasive grains different in size from those of the abrasive composition of the core layer.

The invention is further characterized by an apparatus for automatically feeding a powdery to granular abrasive composition at a constant rate to produce a resinoid wheel according to the method described above, the apparatus comprising an intermittently driven belt conveyor, a slitter having a predetermined width and positioned at an adjustable specified level above the rear end of conveying surface of the belt conveyor, walls provided at the opposite sides of the belt of the belt conveyor and spaced apart in parallel to each other by a distance equal to the width of the slitter to prevent the abrasive composition from dropping, feed means disposed to the rear of the slitter for feeding the abrasive composition onto the belt conveyor, and a downwardly extending feeding tube disposed at the front end of the belt conveyor and pivotally movable in timed relation to the operation of the belt conveyor, the feeding tube opposing a block molding lower die to place the abrasive composition thereinto.

According to the method of this invention, blocks of superposed layers of resinoid abrasive compositions are efficiently rolled into sheets to automatically and inexpensively produce large quantities of various laminated resinoid wheels which are tough, accurate in thickness, free of any distortion and excellent in quality. Since the block of superposed layers of abrasive compositions is passed between multiple opposing pairs of rotating rolls in succession and is thereby rolled into a sheet, the block is subjected to equal pressures on its opposite surfaces. Consequently, the abrasive wheel obtained is uniform in thickness and free of any distortion.

The laminated resinoid wheels obtained by the method of this invention are novel products and comprise laminated layers of abrasive compositions each different in the size of abrasive grains contained therein. A three-layer laminated abrasive wheel, for example, comprises a core layer and layers covering the opposite sides of the core layer and containing abrasive grains smaller than those of the core layer, the core layer thus being harder than the covering layers. Alternatively, the opposite covering layers contain abrasive grains larger than those of the core layer and are therefore harder than the core layer. The abrasive wheel of the former type is capable of cutting large-sized superhard materials such as a large mass of special steel, solid bar measuring 200 to 300 mm in diameter and made of special steel or stainless steel. Since the opposite covering layers are somewhat softer than the core layer in this case, the overall cutting resistance is relatively small and entails reduced heat generation, with the result that a very neat cut surface is obtained without any scorching, distortion and irregularities while the abrasive surface is prevented from clogging. The abrasive wheel of the latter type cuts relatively small hard steel materials within a short time. Although heat will be accumulated in the center portion of the wheel, the soft core layer among the laminated three layers encounters especially small cutting resistance which involves reduced heat generation, so that the overall heat accumulation can be reduced. Accordingly, a very smooth cutting operation can be conducted without irregularities, scorching and distortion in the cut portion, with the abrasive surface rendered free of clogging.

The resinoid wheels of this invention further include a reinforced laminated resinoid wheel which has such construction that a reinforcing sheet material is interposed between the above-mentioned core layer and each of the opposite covering layers as an intermediate layer. The reinforcing sheet material which is glass fiber net, glass cloth or glass mat enables the foregoing three-layer abrasive wheel to exhibit its ability more effectively.

Further included within the scope of this invention are various laminated abrasive wheels having a desired number of abrasive layers. Briefly, the resinoid wheels of this invention comprise a core layer made of an abrasive composition and at least one pair of layers arranged on the opposite sides of the core layer symmetrically thereof and made of an abrasive composition containing abrasive grains which are different in size from those of the core layer.

The apparatus of this invention for feeding the abrasive composition at a constant rate is useful in preparing superposed layers of the abrasive compositions, making it sure to produce the laminated abrasive wheel of this invention continuously in a large quantity.

DESCRIPTION OF THE PREFERRED EMBODIMENTS

Figure 5:
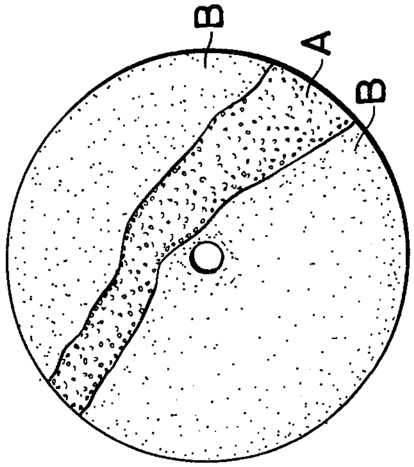
FIG. 5 is a plan view partly broken away to show a three-layer laminated resinoid wheel of this invention.

Production of the three-layer laminated resinoid wheel shown in FIG. 5 will first be described.

Figure 1:
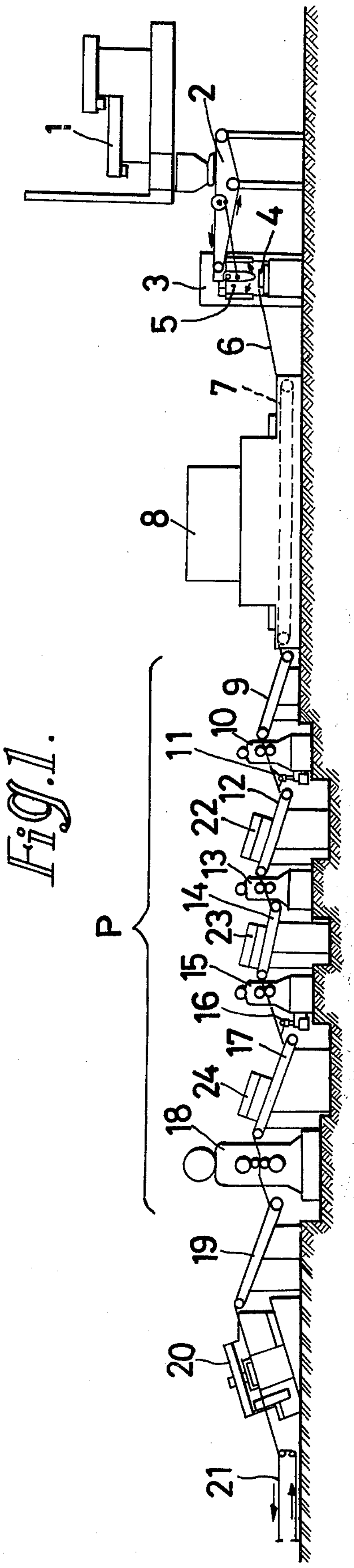
FIG. 1 is a schematic side elevation showing an embodiment of the overall apparatus for producing a laminated resinoid wheel according to this invention.
Figure 2:
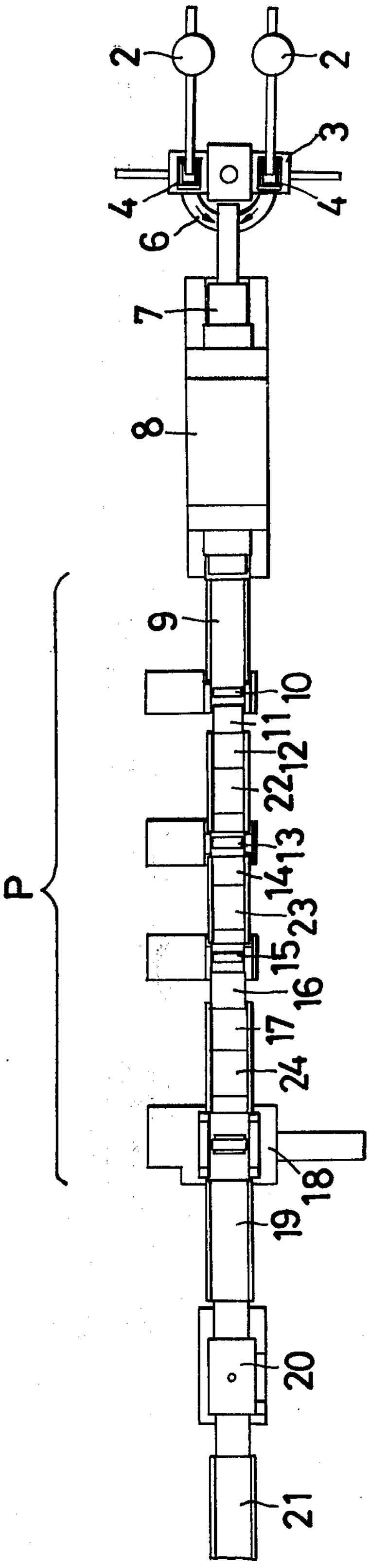
FIG. 2 is a schematic plan view showing the same.

With reference to FIGS. 1 and 2, abrasive grains of silicon carbide, alumina or siliceous sand, a binder such as phenolic resin, epoxy resin, diallyl phthalate resin or like thermosetting synthetic resin and, when desired, a filler such as creolite, iron disulfied, red iron oxide or clay are fed to two mixers 1 and 1 of the two-stage type (one mixer not shown) in specified amounts respectively to prepare two kinds of abrasive compositions, the abrasive grains in one of the compositions being different in size from those of the other composition. The compositions are supplied to first and second feeders 2 and 2 respectively. The proportions by weight of the ingredients of each composition are 60 to 90 parts of abrasive grains, 10 to 20 parts of binder and 0 to 20 parts of filler. The coarse abrasive grains to be used are 16- to 46-mesh in size, while fine grains are of 60- to 150-mesh size. The abrasive compositions described above contain, for example, 80-mesh abrasive grains and 20-mesh abrasive grains respectively. The compositions may contain different binders and fillers respectively but, in most cases, it is preferable to use the same ingredients for the two compositions.

The abrasive composition containing fine 80-mesh abrasive grains is then fed by the first feeder 2 to the lower die 4 of a block molding machine 3 in the form of a layer having an average thickness of 6 mm. Subsequently, the second abrasive composition containing coarse 20-mesh abrasive grains is fed onto the layer of first abrasive composition in the lower die 4, the second abrasive composition being placed in the form of a layer having an average thickness of 17 mm. Finally, the abrasive composition containing fine abrasive grains is placed over the layer of second abrasive composition in the lower die 4 to an average thickness of 6 mm in the form of layer. Thus a three-layer mass is prepared. The molding machine 3 includes a flat plate-like upper die 5 positioned at its center and movable up and down and two boxlike lower dies 4 alternately movable outward from the center and then inward. The upper and lower dies 5 and 4 are heated to a temperature, for example, of 70° to 90°C. The resinoid abrasive masses are subjected by the molding machine 3 to pressure, for example, of 80 to 140 $kg/cm^2$ for 20 to 60 seconds and is thereby molded in succession into blocks having a size in the range of from 260 mm × 380 mm × 25 mm to 400 mm × 500 mm × 40 mm. The molded block is then transferred by a chute 6 onto a first conveyor 7, which passes the block through a high frequency heater 8 to heat the block for example at a temperature of 40° to 75°C for 15 to 25 seconds. The block is then sent to a rolling machine P having multiple pairs of rolls. More specifically, a second conveyor 9 continuous with the first conveyor 7 feeds the heated block to first rolls 10. The rolled sheet obtained is then placed onto a first turntable 11, turned 90° and sent by a third conveyor 12 to second rolls 13, whereby the rolled sheet shaped by the first rolls is rolled transversely. The resulting rolled sheet is thereafter carried on a fourth conveyor 14 to third rolls 15 and rolled. The sheet is further transferred onto a second turntable 16, turned 90° and then carried by a fifth conveyor 17 to a fourth unit of four high-precision rolls 18 which are vertically arranged in a row, whereby the abrasive sheet is eventually made into a sheet measuring 400 to 1,200 mm in width and 1 to 15 mm in thickness. The sheet is then fed by a sixth conveyor 19 to a blanking press 20, by which circular pieces are blanked out from the sheet. In the present example, two to four raw circular abrasive pieces are blanked from one sheet. The circular pieces obtained are then placed between polished iron discs and baked in a tunnel type electric furnace or like device at a temperature suitable for the curing of the aforementioned synthetic resin used as the binder. For baking, the circular pieces are heated progressively from room temperature to 180°C over a period of about 1 day. Consequently, a three-layer circular laminated abrasive product is finally obtained which measures 4.5 mm in thickness and 510 mm in diameter and comprises a core layer A containing 20-mesh coarse abrasive grains and opposite outer layers B containing 80-mesh fine abrasive grains as shown in FIG. 5. Preferably, the third, fourth and fifth conveyors 12, 14 and 17 are provided with infrared heaters 22, 23 and 24 for maintaining the uncured abrasive sheet at a predetermined temperature during transport. The second turntable 16 may be turned as when desired to spread the abrasive sheet widthwise for the production of large-sized abrasive wheels. Further as illustrated in FIG. 2, the block molding machine 3 preferably has two lower dies 4 for receiving and compressing the starting compositions alternately so that continuous operation can be carried out very smoothly. Such apparatus is disclosed for example in Japanese Utility Model Application No. 128551/1972 already filed by the present applicant. To assure continuous operation, the blanking press 20 for uncured resinoid abrasive sheet may advantageously be of such construction that circular pieces can be blanked out from the sheet in timed relation to the movement of the sheet. Such apparatus is disclosed for example in Japanese Patent Application No. 111785/1972 already filed by the present applicant.

Figure 6:
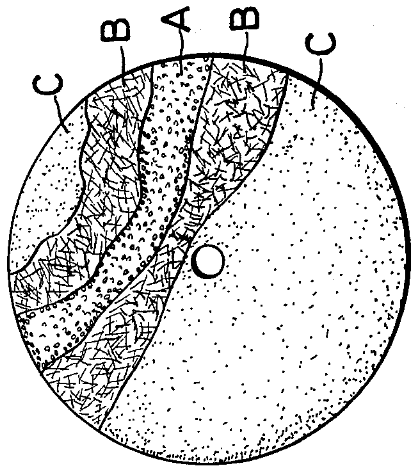
FIG. 6 is a plan view partly broken away to show a five-layer laminated resinoid wheel of this invention.

FIG. 6 shows a five-layer laminated resinoid wheel composed of two kinds of abrasive compositions each containing abrasive grains different in size from those of the other composition and two reinforcing sheets for example of glass fiber net. To produce such resinoid wheel, abrasive grains of different sizes, binder and filler are mixed together by the two mixers 1 and 1. The two kinds of abrasive compositions thus formulated are fed to the lower die 4 of the block molding machine 3 by the two feeders 2 and 2. First, the composition containing fine abrasive grains is placed into the lower die 4 in the from of a 6-mm thick layer. Previously, a glass fiber net having a binder deposited thereon is prepared by immersing the net in a solution of binder and drying. Three or four sheets of the glass fiber net each having a thickness for example of 0.4 to 0.9 mm are placed to a thickness of 0.4 to 4.5 mm over the abrasive composition in the lower die 4. The composition containing coarse abrasive grains is then placed over the glass fiber net, for example, in the form of a 14.5-mm thick layer, over which the same number of sheets of glass fiber net are further placed. Finally the composition containing fine abrasive grains is placed over the glass fiber net in the form of a 6-mm thick layer. The layers in the lower die 4 are then lightly compressed by the upper die 5 to form a block of laminated abrasive composition, which is thereafter treated in the same manner as in the production of the three-layer laminated resinoid wheel already described. Consequently, a circular resinoid wheel is obtained which measures 4.5 mm in thickness and 510 mm in diameter and comprises a core layer A containing 20-mesh coarse abrasive grains, opposite outer layers B containing 80-mesh fine abrasive grains and intermediate layers C of reinforcing sheet as shown in FIG. 6.

If rolls coated with rubber or some other material equivalent thereto such as elastic synthetic resin, copper, lead, soft zinc or like soft metal are employed for the terminal unit of rolls for rolling the block of abrasive composition, the uncured resinoid abrasive piece obtained can be made rough-surfaced on its opposite sides. When baked, the piece will make an improved resinoid wheel.

More specifically, the resinoid bonded grinding wheel thus produced has rough front and rear surfaces with the abrasive grains alone projecting therefrom and therefore exhibits a greatly improved cutting ability. In fact, such grinding wheel is capable of cutting steel pipes and like hard metal materials easily, rapidly and with reduced heat generation to produce a cut surface which is free of burning, distortion and discoloration. The resulting cut-off metal piece is accordingly suitable for the subsequent treatment. In this case the apparatus may advantageously include five pairs of rolling rolls, with the terminal pair of rolls covered with rubber, and an additional high frequency heater disposed immediately before the terminal pair to prevent the rolled sheet from cooling and to render the sheet rough-surfaced on its front and rear sides.

Figure 3:
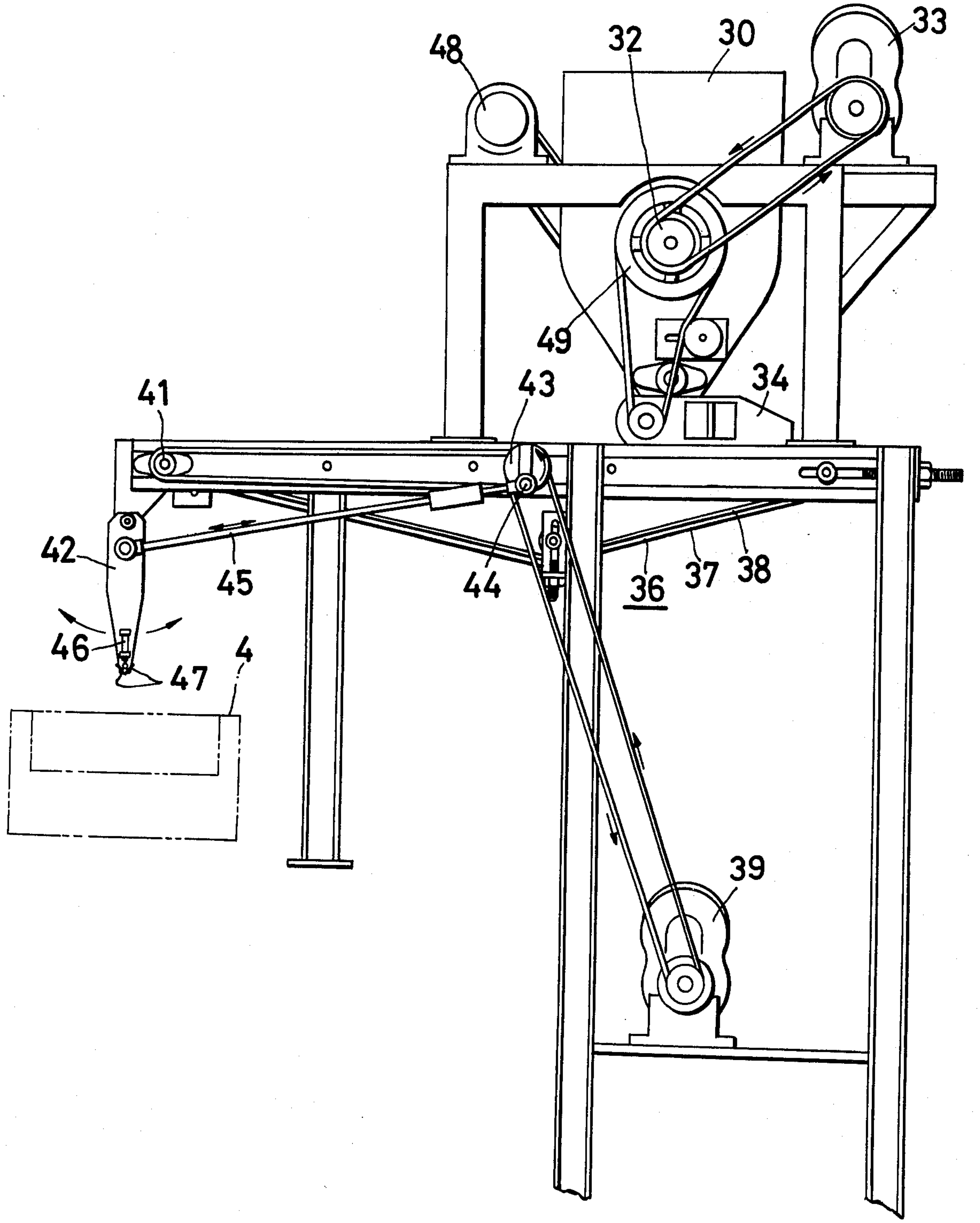
FIG. 3 is a side elevation on an enlarged scale showing an apparatus for feeding an abrasive composition to be used in this invention.
Figure 4:
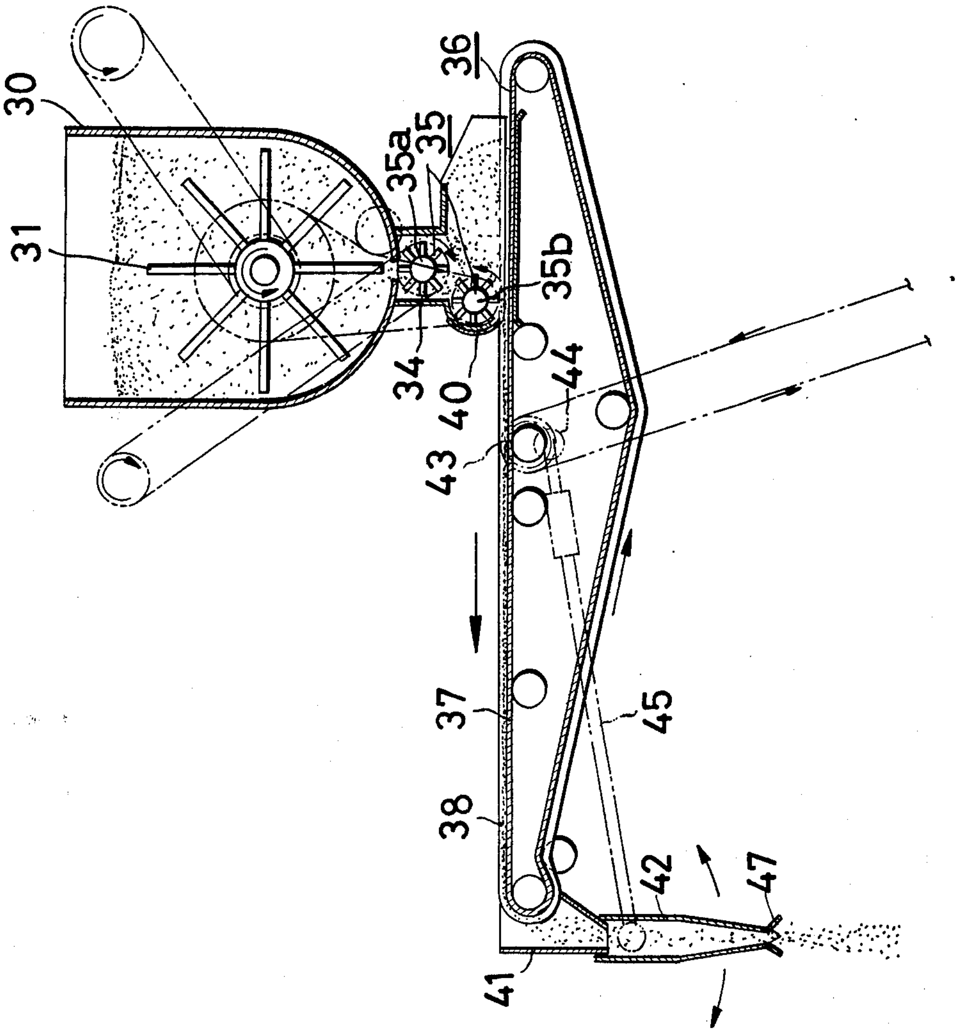
FIG. 4 is a view in vertical section of the same.

With reference to FIGS. 3 and 4, an embodiment of the feeder 2 for feeding the abrasive composition at a constant rate will now be described.

The abrasive composition prepared by the mixer 1 of the two-stage type is charged into the hopper 30 of the feeder 2. Disposed in the hopper 30 is a blade agitator 31 which is driven by a motor 33 by way of a drive sprocket 32 mounted on the same shaft as the agitator 31 and disposed outside the hopper 30. The abrasive composition is discharged from the bottom outlet of the hopper 30 onto a belt conveyor 36 while being crushed by a two-stage crusher 35 disposed in a compartment 34 positioned under and communicating with the hopper 30. The belt 37 of the belt conveyor 36 is provided at its opposite sides with upstanding walls 38 and 38 which are spaced apart by a given distance in paralled to each other. The conveyor 36 is adapted to be intermittently driven by a motor 39. On the outer side of the front wall of the compartment 34, there is provided a slitter 40 which is positionable at an adjusted level. The upstanding walls 38 and 38 and slitter 40 serve to permit the abrasive composition to be carried on the travelling conveyor 36 uniformly over a definite width, so that a specified amount of the composition can be sent forward by the conveyor being driven for a specified time determined by adjusting an unillustrated timer. At the front end of the belt conveyor 36, there is disposed a feed guide 41 having an opening at its lower end which pivotably carries a feed tube 42. The feed tube 42 is connected by a link 45 to a projection 44 eccentrically mounted on a drive sprocket 43 for the belt conveyor 36. The feed tube 42 is therefore movable back and forth in timed relation to the travel of the belt conveyor 36, whereby the abrasive composition can be placed into the lower die 4 of the block molding machine 3 to a uniform thickness. The lower end of the feed tube 40 is provided with a closure 47 which can be opened and closed by the operation of a cylinder 46. The closure 47 prevents the abrasive composition from dropping from the lower end while the belt conveyor 36 is held out of operation. The upper crusher member 35*a* of the crusher 35 is driven by a motor 48, whilst the lower crusher member 35*b* thereof is driven by the motor 33 by way of a sprocket 49 mounted on the same shaft as the drive sprocket 32.

The present invention can be embodied in other different modes without departing from the spirit and basic features of the invention. Thus the embodiments herein disclosed are given for illustrative purposes only and are not limitative in any way. The scope of this invention is defined by the appended claims rather than by the above specification. All the modifications and alterations within the scope of the claims are to be construed as being covered by the claims.

I claim:

1. In an apparatus for feeding a powdery to granular resinoid abrasive composition having a belt conveyor having a conveying surface, a feed means disposed above the rear end of the conveyor surface of the belt conveyor and including a crasher, and a pivotally movable feeding tube provided at the front end of the belt conveyor, the improvement comprising:

means for intermittently driving the belt conveyor for a predetermined period of time;

a pair of walls provided at opposite lateral sides of the conveying surface of the belt conveyor for regulating the abrasive composition to be fed to a predetermined width; and slitter means provided at the rear end of said conveying surface of the belt conveyor and positioned at an adjustable specified level thereabove between the pair of walls for regulating the abrasive composition to be fed to a predetermined height onto the conveying surface.

2. The improvement, as set forth in claim 1 further comprising:

link means connected to said conveyor belt and to said pivotally movable feeding tube for moving the latter back and forth in timed relation to the travel of the belt conveyor.

* * * * *